United States Patent [19]

Webber et al.

[11] Patent Number: 4,562,740

[45] Date of Patent: Jan. 7, 1986

[54] VIBRATION SENSOR AND THE METHOD OF AND APPARATUS FOR MANUFACTURE THEREOF

[75] Inventors: Hugh C. Webber, Detroit; David V. Tinder, Dearborn, both of Mich.

[73] Assignee: United Technologies Automotive, Inc., Dearborn, Mich.

[21] Appl. No.: 602,251

[22] Filed: Apr. 20, 1984

[51] Int. Cl.$^4$ .................. B21D 39/00; H01L 41/00
[52] U.S. Cl. .......................... 73/651; 73/35; 29/25.35; 29/509; 29/593; 310/25
[58] Field of Search ............... 73/651, 35, 579; 29/25.35, 593, 509, 522; 310/25, 321

[56] References Cited

U.S. PATENT DOCUMENTS

| | | | |
|---|---|---|---|
| 4,114,670 | 9/1978 | Akashi et al. | 29/509 |
| 4,131,484 | 12/1978 | Caruso et al. | 29/25.35 |
| 4,371,804 | 2/1983 | Peng et al. | 310/321 |
| 4,385,473 | 5/1983 | Aoki et al. | 29/25.35 |
| 4,463,596 | 8/1984 | Asakura | 73/35 |

Primary Examiner—Stephen A. Kreitman
Attorney, Agent, or Firm—Stephen A. Schneeberger

[57] ABSTRACT

An improved method and apparatus are provided for making vibration sensors, particularly of the type used in automotive applications wherein a piezoelectric element is affixed to a flexing plate which is mounted on a support stem in "umbrella" fashion. A desired resonant vibrating frequency of the sensor is obtained by progressively working a neck portion of the support stem, as by peening, to effectively decrease the vibrating radius of the plate and thus increase its resonant frequency toward and to a desired resonant frequency. The plate's frequency is monitored and the working of the stem neck portion is terminated when a desired resonant frequency is attained. An inclined support shoulder on the stem below the neck portion facilitates the aforementioned manufacture. An undercut positioned in the stem neck portion near its transition into the support shoulder further facilitates the manufacture.

16 Claims, 7 Drawing Figures

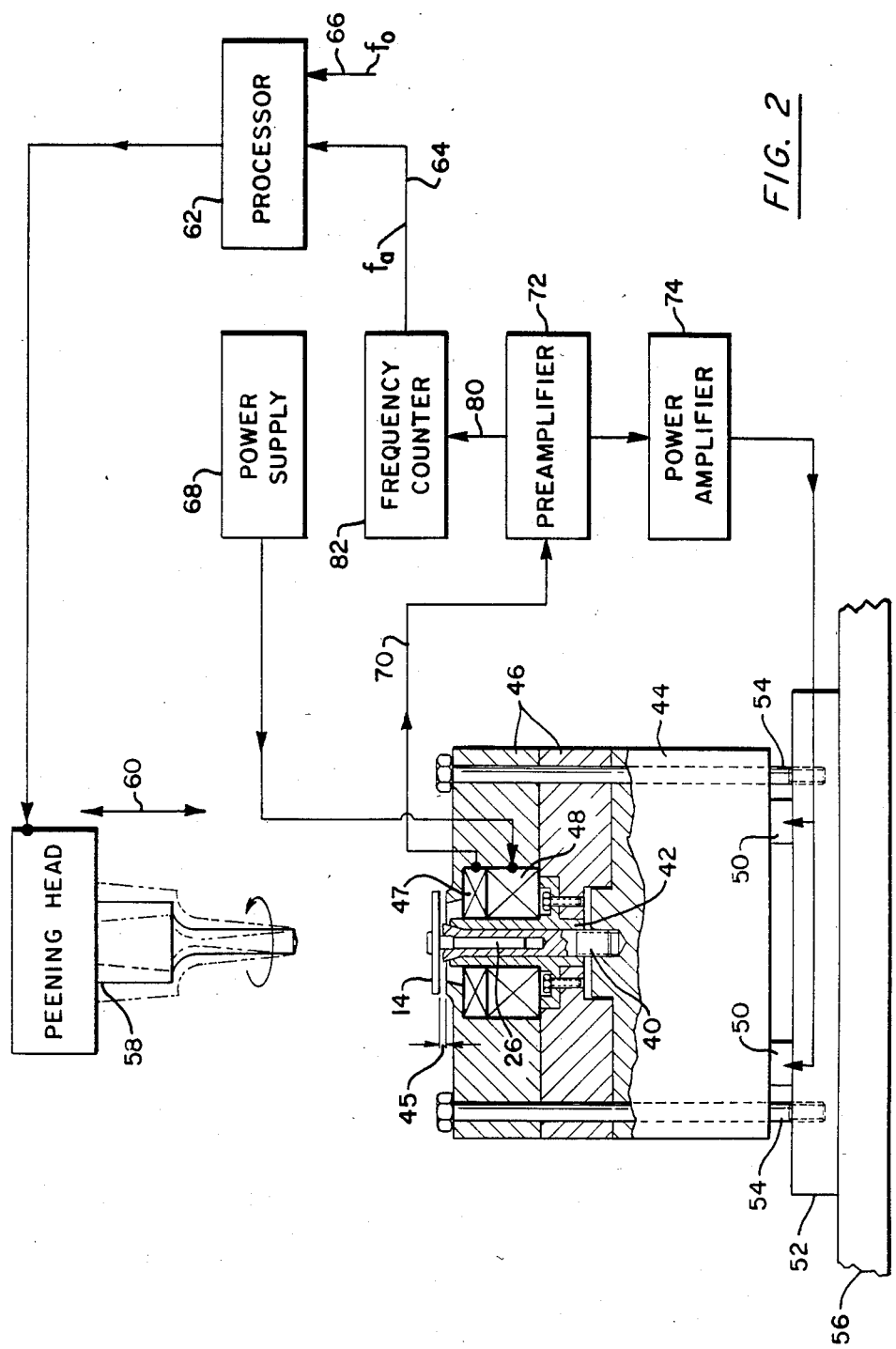

VIBRATION SENSOR AND THE METHOD OF AND APPARATUS FOR MANUFACTURE THEREOF

DESCRIPTION

1. Technical Field

The present invention relates to vibration sensors and to the method of making such vibration sensors. More specifically, the invention relates to a vibration sensor suitable for use as a knock detector in automotive vehicles. More particularly still, the invention relates to a method for making a vibration sensor in a manner which accurately controls and determines the resonant frequency of the sensor.

2. Background Art

The invention is concerned with knock or vibration sensors, especially of the type for sensing a knocking condition in an automotive vehicle. Characteristically, a particular engine will be known to exhibit a knocking or vibration condition at some predetermined frequency, for instance in a region of 6.2 to 6.4 kilohertz. Correspondingly, it is desirable that the vibration sensor have a natural resonant frequency which is substantially the same as the knocking frequency of the engine such that it responds substantially only to those knocking frequencies and not to other vibrational frequencies not characteristic of the knocking condition.

Heretofore, vibration sensors intended to operate at a certain resonant frequency have been designed to close tolerances in order to achieve, or to attempt to achieve, that end. In some instances, after construction of the frequency-establishing components of the vibration sensor was completed, its resonant frequency was checked to determine whether or not it achieved the design objective and in the event it did not, it was discarded. Such method of construction involves considerable cost and attention to tolerances and may nevertheless result in a relatively high percentage of rejected sensors.

One type of vibration sensor which may be constructed at relatively low cost, yet is capable of relatively accurately determining a knock condition in an internal combustion engine, is formed by a piezoelectric element affixed to a flexing disk which is in turn mounted on the end of a support stem to create a resulting "umbrella" or "mushroom"-shaped device. The support stem typically extends in the direction of the vibrational movement and the flexing disk extends transversely thereto such that its resulting flexure at its resonant frequency sufficiently distorts the piezoelectric element to provide a significant electrical signal. Typically, the flexing disk has been affixed to the upper end of the support stem by some form of bonding or mechanical attachment. In one example, the flexing disk is of annular configuration, having a central opening through which the neck portion of the support stem extends. A peening, riveting or heading of the upper end of the stem neck has served to retain the flexing disk on the support stem; however, the peening operation has been performed in an identical manner on each vibration sensor.

Disclosure of Invention

It is an object of the invention to provide a relatively simple and inexpensive vibration sensor capable of a predetermined resonant response in a predetermined knock frequency range. Included within this object is the provision of an improved method of and apparatus for manufacturing such a vibration sensor.

It is yet another object of the present invention to provide an improved method and apparatus for manufacturing piezoelectric vibration sensors of the type in which a flexing plate is centrally mounted on a support stem. Included within this object is the provision of a method of manufacture for such vibration sensors which minimizes the number of sensors rejected for failing to operate within the intended resonant frequency range.

It is a further object of the invention to provide an improved support stem geometry which facilitates practice of the method.

In accordance with the invention there is provided an improved method and apparatus for manufacturing a vibration sensor of the type having a support stem on which is supported a flexing plate for supporting thereon a piezoelectric element. There is also provided a novel vibration sensor in accordance with the invention. The support stem includes a neck portion near its upper end, with a radially enlarged shoulder being formed at the base of the neck portion. The stem neck portion extends through a central opening in the flexing plate. The flexing plate is supported by the stem shoulder portion. An arrangement is provided for affixing the flexing plate to the support stem in a manner which assures that the resonant frequency of the coupled stem and plate corresponds to a predetermined desired frequency or narrow frequency range. Specifically, the stem neck is formed, or deformed, as by peening, in a manner which increasingly decreases the effective vibrating radius of the flexing plate. The terms "formed", "forming", "deformed" and "deforming" are synonymous in their use herein in the manner of the preceding sentence. The stem and flexing plate, prior to deforming the stem neck, have a resonant frequency less than the desired resonant frequency. The flexing plate is caused to vibrate at its resonant frequency, which frequency is then sensed to provide an indication of the then-existing resonant frequency of the system. That frequency is compared with the desired resonant frequency and the stem neck continues to be deformed to increase the system's resonant frequency to the desired frequency.

In accordance with a preferred embodiment of the invention, the shoulder of the support stem is contoured such that increased force on the flexing disk in the direction of the stem shoulder, as by increased peening, serves to extend or move in a radially outward direction the region of the flexing disk supported by the stem's shoulder thereby effectively shortening the vibrating radius of the flexing plate. The support stem shoulder is inclined, and an undercut may be provided in the stem neck portion where it transitions into the shoulder portion. The existing resonant frequency of the support stem and flexing plate is determined by stimulating the plate to vibrate at its resonant frequency and then sensing that frequency. Piezoelectric drivers may be used in stimulate plate vibration, and the modulation of a magnetic field by the vibrating plate is sensed to indicate the resulting frequency.

BRIEF DESCRIPTION OF THE DRAWINGS

FIG. 2 is a schematic and block diagram of the system utilized to practice the manufacturing method of the invention;

BEST MODE FOR CARRYING OUT THE INVENTION

Figure 1:
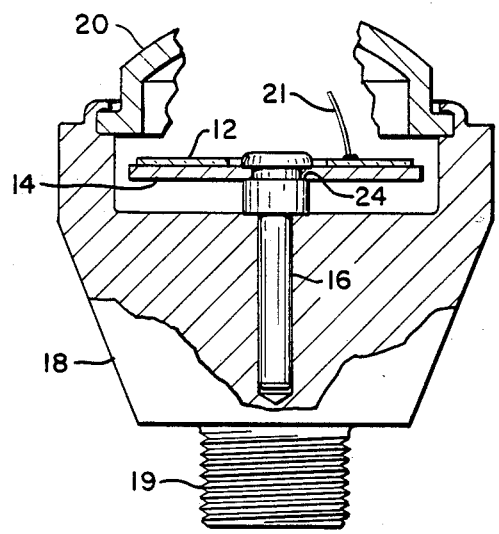
FIG. 1 is a cutaway side view of a vibration sensor showing the vibration sensing mechanism constructed in accordance with the prior art.

Referring to FIG. 1 there is illustrated a vibration sensor 10 constructed in accordance with the prior art. The vibration sensor 10 is of the type used for detecting certain vibrations known as "knocking" in an internal combustion engine. Sensor 10 embodies a mechanically resonant system which responds to engine vibrations in the predominant frequency range of the "knock" signature. The resonant system includes a piezoelectric element 12 which generates an alternating electrical signal proportional to the mechanical response. The principal component which establishes the resonant frequency is a steel disk or flexing plate 14 which is fixed at the center and free at its periphery. The flexing plate 14 is supported at its center by a steel support stem 16. The support stem 16 is mounted, as by press-fitting, in a steel housing 18 having a threaded base 19 for mounted, vibration transmitting engagement with the engine. A closure 20 is retained in sealed engagement with the housing 18 and serves also as a connector through which an electrical lead wire 21 extends. The piezoelectric element 12 includes upper and lower electrodes on its upper and lower surfaces respectively. Lead 21 is soldered to the upper electrode on piezoelectric wafer 12. The lower electrode on wafer 12 is connected to electrical ground via flexing plate 14, support stem 16 and the housing 18.

The flexing plate 14 has been a precision stamping so that very tight tolerances could be held on its thickness, outside diameter, and inside diameter with comparative ease. If a different resonant frequency was required for a specific engine, the thickness and outside diameter of the flexing plate 14 were changed. The flexing disk 14 was supported on an annular shoulder 24 formed on the support stem 16 and extending substantially perpendicularly to the longitudinal extent thereof. The flexing disk 14 was held in position on the support stem 16 by peening the head of the support stem to provide good mechanical engagement. Typically the peening operation involved peening the neck or head of the support stem 16 for some brief predetermined interval.

Despite the attention to tolerances in making the flexing plate 14, the flexing plate 14 and support stem 16 often exhibited an unacceptable resonant frequency when they were finally assembled and had to be discarded.

Figure 3:
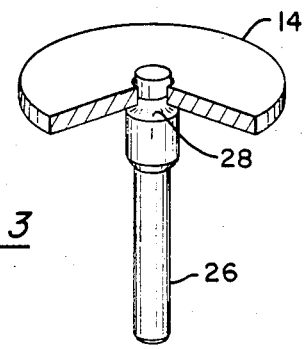
FIG. 3 is a perspective view, partly broken away, of the preliminary assembly of a support stem and flexing plate of a vibration sensor in accordance with the invention.
Figure 4:
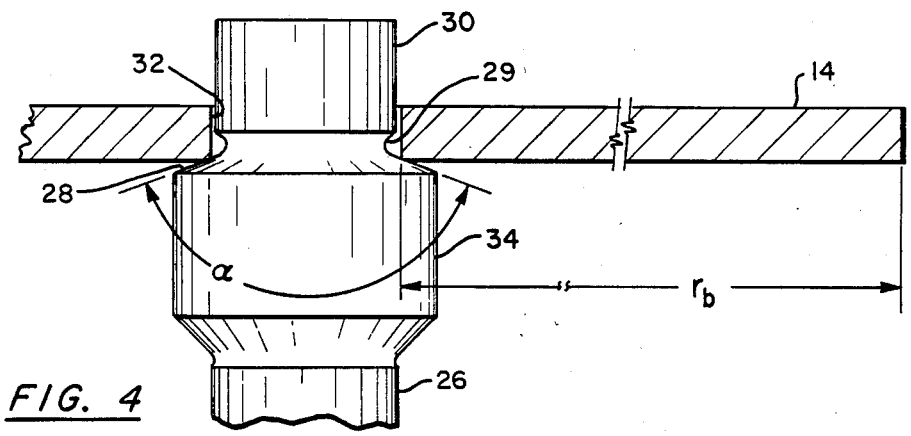
FIG. 4 is a fragmentary sectional side view of the support stem and flexing plate of FIG. 3.

In accordance with the invention, the flexing plate or disk and its support stem are so structured and are assembled to one another in such a manner as to facilitate the attainment of a desired resonant frequency in the resulting combination. Referring to FIGS. 3 and 4, an annular steel flexing plate 14, preferably possessing magnetic properties in accordance with an aspect of the invention, is shown supported on a steel support stem 26 having a support shoulder 28 of improved geometry. FIG. 2 illustrates the mechanism for practicing the manufacturing method of the invention on the flexing plate and stem subassembly of FIGS. 3 and 4. The annular flexing plate 14 is substantially the same as is illustrated in the prior art vibration sensor 10 of FIG. 1; however, the support stem 26 includes a neck portion 30 at its upper end which preferably transitions therebelow into a support shoulder 28 of improved geometry. The neck portion 30 of support stem 26 is of slightly smaller diameter than the central opening 32 extending through the flexing disk 14. Below the stem neck portion 30, the stem includes a portion 34 having a diameter which is greater than the diameter of the opening 32 in the flexing disk 14. The transitional surface between the neck portion 30 and the radially enlarged portion 34 of the stem 26 defines a shoulder 28 which provides vertical support to the flexing disk 14. Importantly to the invention, support shoulder 28 is inclined conically downward from the horizontal such that it forms an included angle $\alpha$ with the longitudinal centerline of stem 26, which angle is less than 180°, as for instance in the range of 120° to 160°. Such inclination of the support shoulder 28 permits the vibrating radius of the flexing disk 14 to be controllably shortened in accordance with the invention, as will be hereinafter explained.

Figure 7:
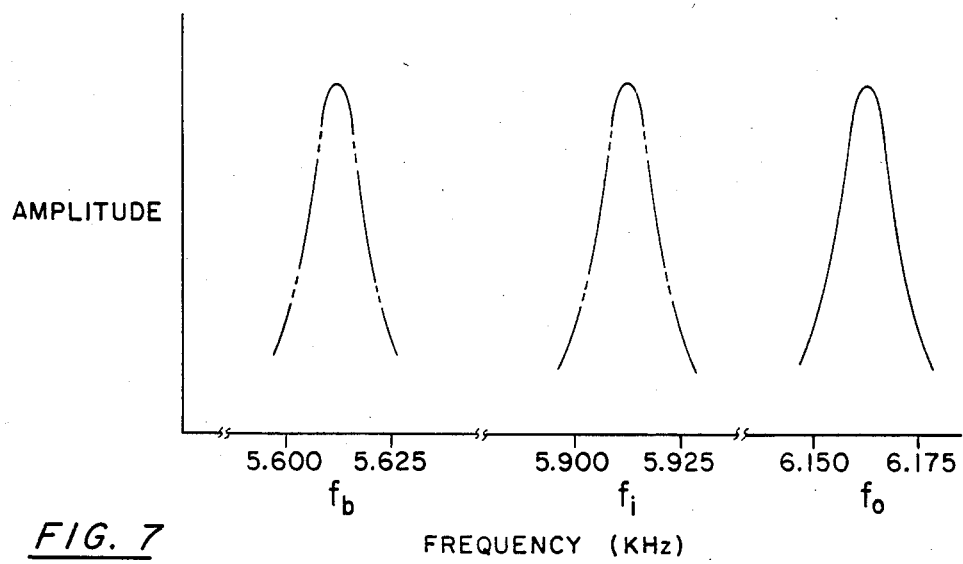
FIG. 7 is a graph of the response characteristics of the support stem and flexing plate assembly at the different stages of assembly represented in FIGS. 4, 5 and 6.

Referring to FIG. 4, the flexing disk 14 rests on the shoulder 28 of support stem 26 along a line which coincides with the diameter of opening 32 in the flexing disk. The effective vibrating radius of the flexing plate 14 at this beginning stage of assembly is designated $r_b$ and extends from the outer diameter of the flexing plate to the inner diameter. Assuming the flexing plate 14 and support stem 26 to be rigidly joined to one another in the configuration illustrated in FIG. 4, their resonant frequency might be designated $f_b$ as illustrated in the leftmost trace of FIG. 7.

Referring to the assembly apparatus of FIG. 2, a support stem 26 with flexing plate 14 resting thereon is firmly held by a collect 40 housed within a collet socket 42. An air solenoid 44, operatively disposed beneath the collet 40, acts to draw the collet downward within socket 42 for the collet to grip a support stem 26. The collet 40, socket 42 and solenoid 44 are mounted on a rigid base plate 52 with bolts 54. The base plate 52 is in turn supported on a worktable 56.

A forming or peening head 58 associated with an orbital or radial forming machine (not shown) of a known type, such as the Bracker-Radial ® riveting machine, manufactured by the Bracker Corporation of Pittsburgh, Pa., is positioned over the worktable 56 and is capable of being moved axially into and out of engagement with the upper end or head of the neck portion 30 of the support stem 26, as represented by the bidirectional arrow 60, to effect the requisite peening of the support stem and flexing plate. Automatic control of the peening head 58 is provided by a suitably programmed processor 62 of conventional design. The processor 62 compares a signal, $f_a$, appearing on line 64 and representative of the actual resonant frequency of plate 14 with the desired resonant frequency, $f_0$, as represented by input 66. It will be understood that the desired resonant frequency, $f_0$, might instead be a narrow range of acceptable resonant frequencies.

A magnetic frame 46 encircles the collet socket 42 and is formed by a pair of soft iron or steel plates in stacked arrangement and encircling the collet socket 42. Also encircling the collet socket 42 and disposed within the magnetic frame are a pick-up coil 47 and a field coil 48 concentrically disposed about the collet socket 42 and disposed a short distance beneath the upper surface of the magnetic frame 46, assuming plate 14 is of a magnetic material. The axial positioning of the support stem 28 in the collet 40 is such as to create a small magnetic air gap 45 between the undersurface of the flexing plate 14 and the upper surface of the magnetic frame 46, assuming plate 14 is of a magnetic material.

A vibrating stimulus may be imparted to the mounting stem 26 and flexing plate 14 via collet 40, magnetic frame 46, and air solenoid 44 by means of one or more vibrators or drivers, such as piezoelectric driving elements 50 positioned on the base plate 52. A DC power supply 68 applies a DC potential to coil 48 to provide a magnetic field which spans the air gap 45 between the magnetic frame 46 and the flexing plate 14. The vibration of the flexing plate 14 serves to vary the spacing and thus the reluctance of the air gap 45 at the resonant frequency of the vibrating plate. Accordingly, an EMF is induced in the pick-up coil 47, which EMF has a frequency which corresponds with that of the vibrating plate 14. The resulting EMF induced in the coil is extended, via lead 70, to a preamplifier 72 where it is developed and amplified as an oscillating signal. From preamplifier 72, the signal is extended via a power amplifier 74 to drive the several piezoelectric drivers 50. Thus it will be seen that there is defined a self-resonant closed loop including the piezoelectric drivers 50 and the flexing plate 14. There is sufficient inherent noise and instability in the closed loop to initially stimulate the piezoelectric drivers and thus initiate vibratory oscillation of the closed loop.

A further output from the preamplifier 72 is extended via line 80 to a frequency counter 82 which provides the "actual" frequency output, $f_a$, appearing on line 64 which is extended to processor 62.

While in the aforementioned embodiment a pair of coils 47 and 48 form part of an arrangement which magnetically senses the resonant frequency of the vibrating plate 14, it should be understood that the functions of the two coils might in some instances be obtained from a single coil or a permanent magnet might replace coil 48. Moreover, the frequency of the resonant vibrations of plate 14 might alternatively be detected using optical or acoustical means.

Figure 5:
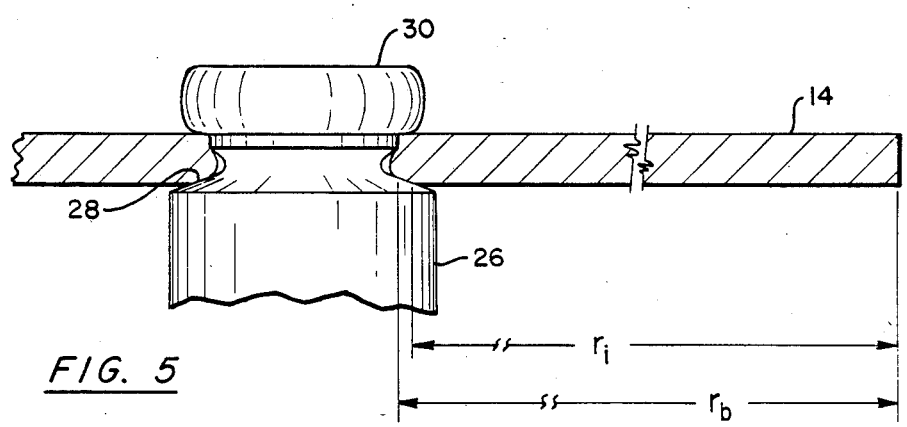
FIG. 5 is a view similar to that of FIG. 4 and showing the support stem and flexing plate at an intermediate stage of assembly.

In operation, the system is programmed or controlled such that the peening head 58 applies an initial peening force of limited duration to the upper end of neck portion 30 of the support stem 26. Whereas the initial, or beginning, resonant frequency, $f_b$, of the flexing plate 14 might have been in the range of 5.6–5.625 kHz, the application of the peening force to the support stem 26 serves to deform the head, or top, of the neck portion 30 in a manner illustrated in FIG. 5 such that the flexing plate 14 is forced downwardly against the support shoulder 28 of the support stem. As the flexing plate 14 is forced downwardly, its region of contact with the support shoulder 28 typically increases and is extended radially outward, as through some deformation of the plate and or shoulder, such that the effective vibrating radius of plate 14 is reduced to an intermediate radius, $r_i$, illustrated in FIG. 5. Because the radius of the vibrating element 14 is decreased, its resonant frequency is correspondingly increased. For the situation illustrated in FIG. 5 in which the effective vibrating radius of plate 14 is $r_i$, its corresponding resonant frequency is designated as $f_i$ in the graph of FIG. 7 and may typically be in the range of 5.9–5.925 kHz.

Figure 6:
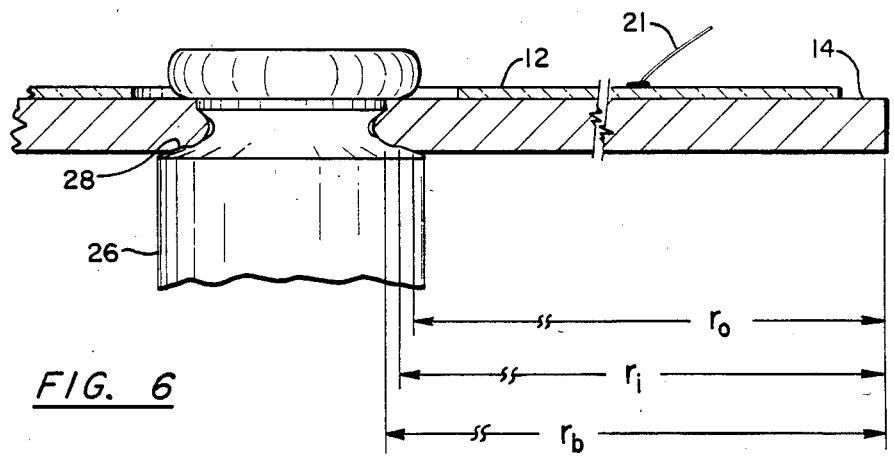
FIG. 6 is a view similar to that of FIG. 5 showing the support stem and flexing plate as finally assembled and including a piezoelectric element mounted thereon.

Correspondingly, successive peening operations, each of limited duration, will serve to further decrease the effective vibrating radius of the flexing plate 14 until it achieves some radius, $r_0$, illustrated in FIG. 6, at which the corresponding "actual" frequency, $f_a$, on line 64 meets, or slightly exceeds, the desired resonant frequency $f_0$.

The dimensions of the flexing plate 14 are preselected such that the beginning resonant frequency, $f_b$, is always less than the desired or target frequency, $f_0$. In one preferred embodiment, $f_0$ is in the range of 6.15 kHz to 6.175 kHz and the beginning frequency, $f_b$, may be in the range of 5.5–5.7 kHz. The peening head 58 applies a peening force to the stem neck 30 for a predetermined limited interval, as for instance one second, and is then withdrawn. The measurement of the actual resonant frequency, $f_a$, is typically made with the peening head 58 withdrawn to avoid problems with noise. Assuming $f_a$ is still less than $f_0$, the peening head 58 will return for another peening operation of limited duration. The control program of the processor 62 may be structured such that as the frequency $f_a$ nears the desired frequency $f_0$, the duration of the peening intervals is decreased to minimize the possibility of over-peening the support stem and flexing plate and exceeding the desired frequency, $f_0$, by an impermissible amount. In this latter regard, the desired frequency, $f_0$, typically is a frequency range of 25 Hz, and the support stem is peened until the actual frequency, $f_a$, exceeds the lower limit of that range, i.e., 6.150 kHz, whereupon it is discontinued. Normally the frequency of the resulting combination of flexing plate 14 and support stem 26 at that point is within the design range. However, a further test of the frequency, $f_a$, is made and if it exceeds the upper limit, i.e., 6.175 kHz, the structure is rejected.

An additional facet of the invention resides in the provision of an annular undercut 29 of semi-circular cross section extending circumferentially around the support stem 26 at an axial position therealong which effectively extends the surface of the support shoulder 28 radially inward in the stem. While the exact function of the undercut 29 is not fully understood, the control of the change in the vibrating radius, r, of the flexing plate 14 as a function of increased peening of the support stem neck 30 is seen to be relatively more continuous, uniform and controllable when the undercut is present then when the neck 30 simply transitions into the shoulder 28 at a seemingly sharp angle. It is felt that the undercut region 29 may reduce axial friction between the neck 30 and plate 14 by providing room for radial expansion and/or that it eliminates the small but finite and variable fillet radius otherwise present at the transition from neck 30 to shoulder 28.

In an illustrated embodiment in which the support stem 26 and flexing plate 14 are to have a resonant frequency of 6.15 kHz, the flexing plate 14 has an outside diameter of 0.8 inch and a thickness of 0.025 in., and the support stem 26 has a diameter of 0.087 in. along neck portion 30 and a diameter of 0.124 in. at the outer end of shoulder 28 defined by region 24. The axial extent of neck portion 30 might be about 0.07 in. and the included angle α of shoulder 28 is approximately 140°. The radial depth of undercut 29 is about 0.005 inch.

Following the aforementioned assembly and "tuning" of the flexing disk 14 and support stem 26, the piezoelectric wafer 12 is bonded to the upper surface of the flexing disk 14 in a conventional manner with a very thin layer of high temperature epoxy such that electrical contact therebetween is assured. The addition of the piezoelectric element 12 typically raises the resonant frequency by about 0.1-0.2 kHz. While it is evident that this latter addition of the piezoelectric element may broaden the range of uncertainty of the final resonant frequency by about 0.1 kHz, such margin is acceptable in view of the close tolerances afforded by the aforementioned assembly of the flexing element and support stem.

In the illustrated embodiment, the piezoelectric element 12 is affixed to the flexing plate 14 following the peening of neck portion 30 to ensure maintenance of good bonded contact therewith and importantly also, because the Q of the flexing plate 14 with the element 12 bonded thereto is sufficiently low during resonant vibration as to make its detection by pick-up coil 47 difficult. On the other hand, if it were desirable or necessary to peen neck 30 after element 12 has been bonded to plate 14, such may be done and the detection of the actual resonant frequency could be accomplished using optic or acoustic means or by deriving an electrical signal from the flexing piezoelectric element 12 itself.

Although an operation has been described in which the neck of the support stem is peened to provide the requisite forces of the flexing disk 14 which cause its outermost point of contact with the shoulder 28 to move radially outward, it will be appreciated that other forming operations might also be used to accomplish that end, as for instance riveting, cold-forming, hot-forming, or the like.

Although this invention has been shown and described with respect to detailed embodiments thereof, it will be understood by those skilled in the art that various changes in form and detail thereof may be made without departing from the spirit and scope of the claimed invention.

Having thus described a typical embodiment of our invention, that which is claimed as new and desired to secure by Letters Patent or the United States is:

1. In the manufacture of a vibration sensor of the type having a support stem on which is supported a flexing plate, a piezoelectric element being affixable to said flexing plate, the flexing plate having an opening therethrough and said stem having a neck portion and a shoulder portion, said stem neck portion extending through said plate opening and said plate being supported by said stem shoulder portion, said stem neck portion being deformable to retain said plate mounted on said stem, the method of controlling the resonant frequency of the flexing plate comprising the steps of:
   forming a preliminary assembly of said plate of said stem;
   applying a vibrational stimulus to said preliminary assembly for causing said plate to vibrate at its actual resonant frequency;
   sensing said actual resonant frequency of said vibrating plate and providing a representation thereof;
   comparing said representation of the actual resonant frequency of said plate with a representation of a desired resonant frequency of said plate;
   progressively deforming said stem neck portion to vary the resonant frequency of said plate; and
   terminating said step of deforming said stem neck portion when a predetermined relationship between said actual and said desired resonant frequencies of said plate has been achieved.

2. The method of claim 1 wherein the characteristics of said flexing plate are preselected such that said actual resonant frequency of said plate of said preliminary assembly prior to said step of deforming said stem neck portion is less than said desired resonant frequency and said step of progressively deforming said stem neck portion progressively increases said actual resonant frequency of said plate.

3. The method of claim 2 wherein said predetermined relationship between said actual and said desired resonant frequencies of said plate is achieved when said actual resonant frequency is at least as high as said desired resonant frequency.

4. The method of claim 3 wherein said desired resonant frequency comprises a narrow range of acceptable resonant frequencies, said frequency range having a lower limit and said predetermined relationship being achieved when said actual resonant frequency of said plate is at least as high as said lower limit of said range of acceptable resonant frequencies.

5. The method of claim 2 wherein said step of progressively deforming said stem neck portion comprises a progression of discrete deforming steps and said step of comparing said actual resonant frequency of said plate with said desired resonant frequency occurs at least after each said discrete deforming step.

6. The method of claim 1 wherein the step of deforming said stem neck portion comprises a peening operation.

7. The method of claim 1 wherein said step of sensing said actual resonant frequency of said plate comprises generating a magnetic field in which said plate defines an air gap in the magnetic circuit, said vibration of said plate at its actual resonant frequency serving to vary the spacing of said air gap at said frequency, and sensing the resulting variations in said magnetic field occasioned by said variations in said air gap spacing thereby to provide an electrical signal which oscillates at said actual resonant frequency of said plate.

8. The method of claim 7 wherein said step of applying a vibrational stimulus to said preliminary assembly comprises connecting piezoelectric driving means in force-transmitting relation with said preliminary assembly and electrically stimulating said piezoelectric driving means.

9. The method of claim 8 wherein said step of electrically stimulating said piezoelectric driving means includes the step of utilizing said electrical signal which oscillates at said actual resonant frequency of said plate for said electrical stimulation of said piezoelectric driving means.

10. In the manufacture of a vibration sensor of the type having a support stem on which is supported a flexing plate, a piezoelectric element being affixable to said flexing plate, the flexing plate having an opening therethrough and said stem having a neck portion and a shoulder portion, said stem neck portion extending through said plate opening and said plate being supported by said stem shoulder portion, said stem neck portion being deformable to retain said plate mounted on said stem, apparatus for determining the resonant frequency of the flexing plate comprising:

a fixture for supporting a preliminary assembly of said plate on said stem;

means for applying a vibrational stimulus to said preliminary assembly for causing said plate to vibrate at its actual resonant frequency;

means for sensing said actual resonant frequency of said vibrating plate and providing a representation thereof;

control means for comparing said representation of the actual resonant frequency of said plate with a representation of a desired resonant frequency of said plate and providing an actuating signal when the actual resonant frequency is lower than said desired resonant frequency; and means responsive to said actuating signal for deforming said stem neck portion to effectively decrease the vibrating radius of said flexing plate and thereby increase the actual resonant frequency of said plate.

11. The apparatus of claim 10 wherein said control means operates to provide said actuating signal in a series of intervals of predetermined, relatively short duration.

12. The apparatus of claim 10 wherein said means for sensing said actual resonant frequency of said vibrating plate includes means for establishing a magnetic field in which said vibrating plate is positioned and coil means for sensing changes in the magnetic field occasioned by and at the frequency of said vibrating plate.

13. In a vibration sensor of the type having a longitudinally extending support stem on which is supported a flexing plate, and a piezoelectric element being affixable to said flexing plate, the flexing plate having an opening therethrough and said stem having a neck and a shoulder portion, said stem neck portion extending through said plate opening and said plate being supported by said stem shoulder portion, said stem neck portion being deformed to retain said plate mounted on said stem, the improvement wherein:

said shoulder portion of said support stem is inclined relative to the longitudinal centerline of said support stem such that a longitudinally inwardly directed force applied to said plate by said deformed stem neck portion operates to move the support of said plate by said shoulder portion relatively outward radially of said plate, thereby to decrease the effective vibrating radius of said plate and thus increase the resonant vibrating frequency of said plate.

14. The vibration sensor of claim 13 wherein the included angle of incline of said stem shoulder portion relative to the longitudinal centerline of said support stem is in the range of 120 to 160 degrees.

15. The vibration sensor of claim 13 wherein the included angle of incline of said stem shoulder portion relative to the longitudinal centerline of said support stem is approximately 140 degrees.

16. The vibration sensor of claim 13 wherein said support stem additionally includes a circumferential undercut extending radially thereinto, said undercut being positioned in said stem neck portion substantially where said neck portion transitions into said shoulder portion.

* * * * *